US006633757B1

(12) United States Patent
Hermann et al.

(10) Patent No.: US 6,633,757 B1
(45) Date of Patent: Oct. 14, 2003

(54) ADJACENCY-BOUND SERVICE DISCOVERY

(75) Inventors: Reto Hermann, Buttikon (CH); Dirk Husemann, Adliswil (CH); Michael Moser, Zurich (CH); Michael Nidd, Adliswil (CH); Andreas Schade, Adliswil (CH)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/487,225

(22) Filed: Jan. 19, 2000

(30) Foreign Application Priority Data

Jan. 29, 1999 (EP) .............................................. 99101889

(51) Int. Cl.[7] ................................................ H04M 3/42
(52) U.S. Cl. ........................ 455/414; 455/517; 370/908
(58) Field of Search .................................. 455/403, 414, 455/422, 456, 517; 370/908

(56) References Cited

U.S. PATENT DOCUMENTS

| 5,544,321 | A | | 8/1996 | Theimer et al. | |
| 5,752,186 | A | * | 5/1998 | Malackowski et al. | ..... 455/414 |
| 6,108,554 | A | * | 8/2000 | Kawamoto | .................. 455/456 |

OTHER PUBLICATIONS

Patent Abstracts of Japan, Publication No. 09–106421, Apr. 22, 1997.
Patent Abstracts of Japan, Publication No. 09–186690, Jul. 15, 1997.

* cited by examiner

*Primary Examiner*—Quochien Vuong
(74) *Attorney, Agent, or Firm*—Law Office of Charles W. Peterson, Jr.; Louis P. Herzberg

(57) ABSTRACT

Scheme and apparatus (10) for distinguishing services offered by a service-providing device in adjacency of the apparatus (10) from services offered by a service-providing device not being in the apparatus' adjacency. All devices—including the apparatus—are part of a wireless local network. The apparatus (10) maintains a record with information about services and associated identifiers as well as a list of identifiers about the service-providing devices. The associated identifiers and the list of identifiers are compared to determine an associated service as being in adjacency of the apparatus if it is rendered by a service-providing device being listed in the list of identifiers. An associated service is determined as not being in adjacency of the apparatus if it is rendered by a service-providing device not being listed in the list of identifiers. The apparatus (10) comprises a network interface (25) for wireless communication with the service-providing devices, and a service discovery module (11) which maintains the record with information services and associated identifiers.

49 Claims, 5 Drawing Sheets

ADJACENCY-BOUND SERVICE DISCOVERY

TECHNICAL FIELD

The invention concerns wireless local area networks and the communication between the devices forming such a network. More specifically, the present invention relates to a communication scheme which allows a first device within the wireless local area network to determine whether some other device which provides a certain service is in adjacency of the first device, e.g. within the same room.

BACKGROUND OF THE INVENTION

Computer terminals and peripherals have become dramatically smaller and more portable. Personal computers and peripherals are small enough to sit on the desk at work. Smaller still are lap top computers and notebook computers. There are computer terminals which are small enough to be mounted in a vehicle such as a delivery truck. Still smaller are the hand held terminals typically used for their portability features where the user can carry the terminal in one hand and operate it with the other. A physical connection of the above devices by means of cables or fibers might have drawbacks, such as configuration constraints because of the limited length of the cable, limited number of ports on the computer thus limiting the number of peripherals that can be attached, cumbersome reconfiguration of hardwired devices, etc. Note that there are some peripheral interface systems where the limited number of ports on the computer does not really limit the number of peripherals. Universal Serial Bus (USB) and IEEE 1394 (Firewire) are examples of peripheral bus systems capable of supporting a large number of devices on a single port. Ethernet is an example of a communication system where the cable is used as a shared medium (other examples are token ring, FDDI (Fiber Distributed Data Interface), and DQDB (Distributed Queue Dual Bus)).

The smaller the devices get, the more important it becomes to replace wired-based physical connections by wireless ad-hoc connections (e.g. body networks, radio frequency connections, or infrared connections), since physically connecting the computer terminals, peripherals, and other devices by means of cables or fibers severely reduces the efficiency gained by making the units smaller. Ad-hoc connections are required where devices move around, enter an area and exit the area. The term ad-hoc refers to the need for frequent network reorganization.

Local area communication is rapidly evolving into what can be called personal local area networks, which are networks for communication between local peers or subsystems. These kind of networks will herein be referred to as local networks. Wireless communication is of particular importance in such local networks. There are different wireless communications approaches known that have been developed and designed with an eye on the communication between peers or subsystems of such local networks.

GTE Corporation has developed a short-range radio-frequency (RF) technique which is aimed at giving mobile devices such as cellular phones, pagers and handheld personal computers (PCs) a smart way to interact with one another. GTE's technique is tentatively named Body LAN (local area network). The original development of Body LAN was via a wired vest with which various devices were connected (hence the name Body LAN). This graduated to an RF connection a couple of years ago.

Xerox Corporation has developed a handheld computing device called PARC TAB. The PARC TAB is portable yet connected to the office workstation through base stations which have known locations. The PARC TAB base stations are placed around the building, and wired into a fixed wired network. The PARC TAB system uses a preset knowledge of the building layout and the identifiers of the various base stations to decide where a PARC TAB portable device is by the strongest base station signal. A PARC TAB portable device has a wireless interface to the base stations. The PARC TAB system assumes that the PARC TAB portable device is always connected to the network infrastructure. The location of each portable PARC TAB device is always known to the system software. The base stations establish regions and are connected to power supplies. PARC TAB communication systems have a star topology.

In an attempt to standardize data communication between disparate PC devices several companies, including Ericsson, IBM, Intel, Nokia, and Toshiba established a consortium to create a global standard for wireless RF-based connectivity between fixed, portable and mobile devices. There are many other adopter companies. The proposed standard comprises an architecture and protocol specifications ranging from the physical layer up to the application layer. The technology will for instance enable solutions to automatically synchronize application information kept in mobile devices with similar information kept in a fixed desktop computer when users enter their offices. Enabling seamless voice and data transmission via wireless, short-range radio, the Bluetooth technology will allow users to connect a wide range of devices easily and quickly, without the need for cables, expanding communications capabilities for mobile computers, mobile phones and other mobile devices. The Bluetooth operating environment is not yet fully defined, but there are expected to be similarities with the IrDA (Infrared Data Association) specification and the Advanced Infrared (AIr) specification. Other aspects that probably will find their way into Bluetooth might stem from the IEEE standard 802.11 and/or HIPERLAN, as promulgated by the European Telecommunications Standards Institute (ETSI).

Bluetooth radio technology provides a mechanism to form small private ad-hoc groupings of connected devices away from fixed network infrastructures. Bluetooth makes a distinction between a master unit—which is a device whose clock and hopping sequence are used to synchronize all other devices—and slave units in the same network segment. In other words, the Bluetooth approach is centralized. A query-based discovery scheme is used for finding Bluetooth devices with an unknown address. Queries are also centralized at a registry server. It is a drawback of such a centralized approach that there is a central point of failure. It is another disadvantage of such a system that more overhead is required than in a distributed scheme. The main problem of such a system is in locating a single registry server, and what to do if it disappears. If a random two devices encounter each other they must first recognize each other's presence, then decide which is the registry server, and then go about their business of communicating. It is this continual selection and re-selection of a leader that causes the increased overhead. The alternative is to expect users to carry one device that they always have with them, and make it always the leader.

This, however, is not always a practical option. Further details can be found in Haartsen, Allen, Inouye, Joeressen, and Naghshineh, "Bluetooth: Vision, Goals, and Architecture" in the Mobile Computing and Communications Review, Vol. 1, No. 2. Mobile Computing and Communications Review is a publication of the ACM SIGMOBILE.

HomeRF (based on Shared Wireless Access Protocol (SWAP)) is another example of an operating environment which can be used to connect devices. A HomeRF Working Group was formed to provide the foundation for a broad range of interoperable consumer devices by establishing an open industry specification for wireless digital communication between PCs and consumer electronic devices anywhere in and around the home. The working group, which includes the leading companies from the personal computer, consumer electronics, peripherals, communications, software, and semiconductor industries, is developing a specification for wireless communications in the home called the SWAP. The HomeRF SWAP system is designed to carry both voice and data traffic and to interoperate with the Public Switched Telephone Network (PSTN) and the Internet; it operates in the 2400 MHz band and uses a digital frequency hopping spread spectrum radio. The SWAP technology was derived from extensions of existing cordless telephone (DECT) and wireless LAN technology to enable a new class of home cordless services. It supports both a time division multiple access (TDMA) service to provide delivery of interactive voice and other time-critical services, and a carrier sense multiple access/collision avoidance (CSMA/CA) service for delivery of high speed packet data. The SWAP system can operate either as an ad-hoc network or as a managed network under the control of a connection point. In an ad-hoc network, where only data communication is supported, all stations are equal and control of the network is distributed between stations. For time critical communications such as interactive voice, the connection point—which provides the gateway to the PSTN—is required to coordinate the system. Stations use the CSMA/CA to communicate with a connection point and other stations. Further details about HomeRF can be found at the Home Radio Frequency Working Group's web site www.homerf.org. The SWAP specification 1.0 is incorporated by reference in its entirety.

The above-mentioned IEEE 802.11 standard for wireless LAN medium access control comprises features for conserving power. At regular intervals, with small random time offsets, LAN members broadcast information about themselves only. If a device receives such a broadcast while it is preparing one itself, it will not broadcast that round. In this way, all devices broadcast their individual characteristics with statistically even distribution. Because the medium access control (MAC) layer is given specific addresses to which it directs transmissions, its image of the LAN does not always need to be up-to-date. It is a clear disadvantage of the approach promulgated in IEEE 802.11 that it might take some time until a newly arrived device or an absent device is announced/noticed. IEEE 802.11 LANs are centralized, star-shaped networks. It should also be noted that the 802.11 advertisements are only about communications characteristics and individual identity, not service offerings.

There are several more or less elaborate protocols and techniques that allow an ad-hoc wireless communication between mobile devices. The above described Bluetooth radio technology and HomeRF approach are prominent examples. All state-of-the-art protocols and techniques have certain drawbacks, as briefly addressed in the following section.

For seamless connection in an ad-hoc local network, the respective devices require a method for becoming aware (discovery) of the services offered by neighbours. In addition, the devices in such a network must make their own services known (advertisement). On one hand, the discovery and advertisement of services offered in a local network must be carried out in a timely manner, but on the other hand battery power must be conserved if portable devices are employed. It is a further requirement for a local network that entering the network is seamless such that the device can easily change locations. It is desirable that no user intervention is required if a device enters or leaves an ad-hoc network. It would be arduous if the user would have to push a button for every reconfiguration, for example. It is also desirable that a device should be able to leave the network without formal notification. A scheme for discovery and advertisement of services in a local network is described and claimed in co-pending European patent application entitled "Service Advertisements in Wireless Local Networks", filed on Jan. 25, 1999, currently assigned to the assignee of the present application.

In a local network environment adjacency-bound service provision can be crucial with certain applications. Application semantics may require or the user may desire that a particular service is furnished in the immediate spatial vicinity of the service-consuming device while for other services the location of the service-providing device is not relevant. Means must be provided that allow the requester of a service to ascertain that the service-providing device is in adjacency to the service-consuming device or the consumer himself/herself. Conventional service discovery schemes fall short of providing the service requester (service-consuming device) with the spatial information needed to make a semantically correct decision.

It is an object of the present invention to provide a scheme enabling adjacency-bound service distinction in a wireless local network.

It is an object of the present invention to provide a scheme for a service-consuming device, which is part of an ad-hoc wireless local network, to determine whether a service is rendered by a service-providing device which is in adjacency of the service-consuming device.

SUMMARY OF THE INVENTION

The present invention concerns a scheme for distinguishing services offered by a service-providing device in adjacency of a first device from services offered by a service-providing device not being in the first device's adjacency. All devices are part of a wireless local network. The first device maintains a record with information about services and associated identifiers as well as a list of identifiers about service-providing devices. According to the present invention, the associated identifiers and the list of identifiers are compared to determine an associated service as being in adjacency of the first device if it is rendered by a service-providing device being listed in the list of identifiers. An associated service is determined as not being in adjacency of the first device if it is rendered by a service-providing device not being listed in the list of identifiers.

Furthermore, the present invention concerns an apparatus which is enabled for using a service offered by a service-providing device which is within the same wireless local network. The apparatus comprises a network interface for wireless communication with the service-providing device, and a service discovery module which maintains a record with information services and associated identifiers, and a list of identifiers about service-providing devices. The service discovery module enables the apparatus to distinguish a service offered by a service-providing device in adjacency of the apparatus from a service offered by a service-providing device not being in adjacency of the apparatus.

The present invention relates generally to wireless local networks and, more specifically, to a scheme which allows a service-consuming device within the local network to determine whether a particular service is rendered by a service-providing device within adjacency of the service-consuming device.

The present solution allows to combine a scheme for advertisement and/or discovery of services with a scheme for distinguishing services rendered by devices within adjacency of a service-consuming device from services rendered by devices which are not within its adjacency.

With the present invention, a solution is presented that, when used in combination with a wireless communications protocol, allows to ensure/control that certain services or tasks are carried out or assigned to devices which are within adjacency of the device which requests the service. According to the present invention a local network of all devices that are reachable, including those devices which cannot be reached directly but via one or more other devices, can be maintained, and inside this local network a smaller sphere (herein called adjacency) surrounding a service-consuming device (or user) can be defined. The notion of adjacency is herein used to help a service-consuming device to distinguish whether a service-providing device that renders a particular service is within the same area as the service-consuming device. I.e., one is able to select a service-providing device that is close to the user, or in the same room, for example.

The present scheme for distinguishing services can be used to define logical ad-hoc groups of devices within a local network, whereby such a group of devices includes all service-providing devices that are in adjacency of a particular service-consuming device.

Devices according to the present invention do not necessarily have to have identical implementations (from a software and/or hardware point of view) as long as at least the present scheme for distinguishing services is implemented in these devices.

The present scheme facilitates implementations where for example a user or an application selects a service-providing device that is in convenient reach, e.g. a speaker that is close to the user;

a user or an application selects a service-providing device that is in the same room or bay of an open space office;

a user or an application selects a service-providing device that is allowed or enabled to handle classified information such as confidential or personal information;

a user or an application selects service-providing devices that offer a composite service and where at least the final input/output device that renders the composite service are in adjacency of the service-consuming device. Note that the intermediate devices of a service rendering device-chain need not be in adjacency of the service-consuming device.

DESCRIPTION OF THE DRAWINGS

The invention is described in detail below with reference to the following schematic drawings. It is to be noted that the Figures are not drawn to scale.

DESCRIPTION OF PREFERRED EMBODIMENTS

Figure 1A:
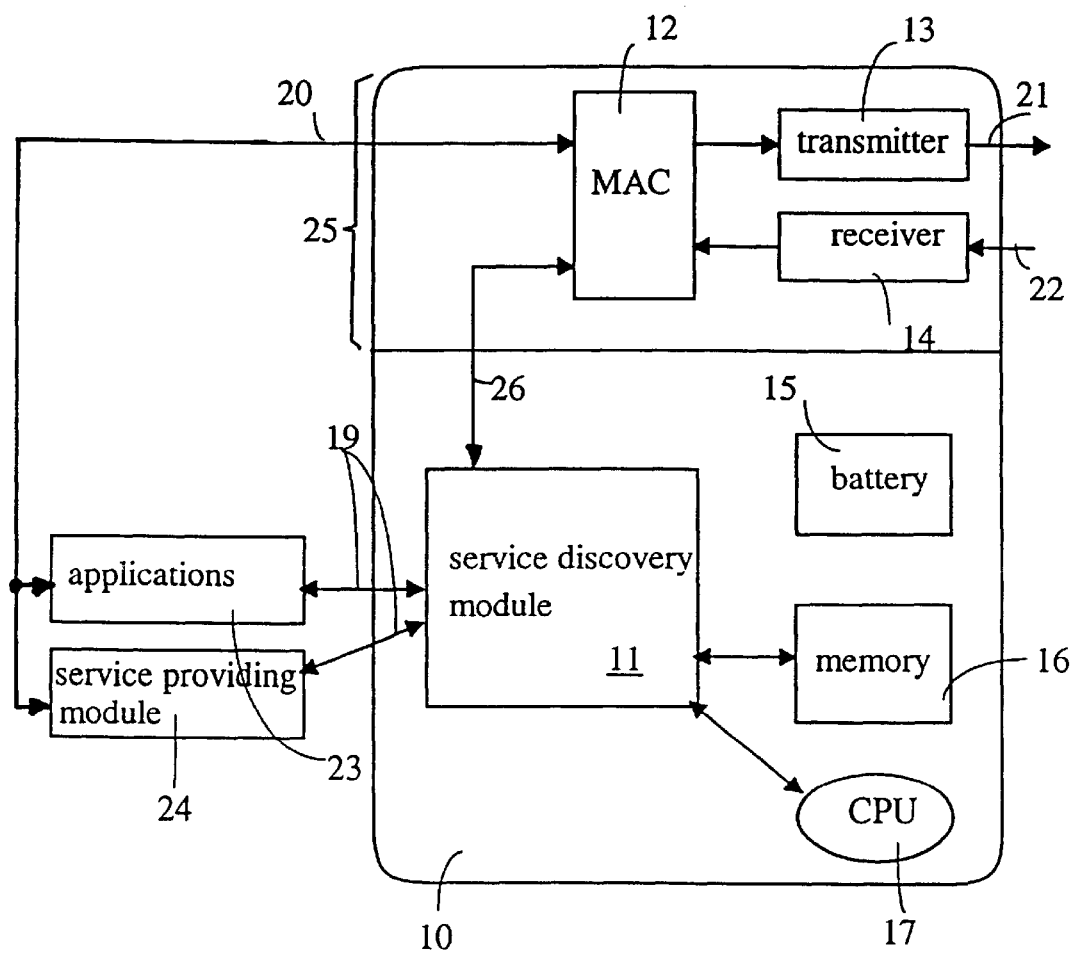
FIG. 1A is a schematic block diagram of an embodiment, in accordance with the present invention.

For the purpose of the present description, a wireless local network is defined as being a network composed of devices that can communicate with each other without the need for a wired network. The local network might be established by means of infrared (IR), radio-frequency (RF), such as HomeRF for example, or other means. A wireless local network does not need to have an access point for connection to a fixed network. The wireless local network may be completely isolated from any other network, or it might comprise one or more access points which provide the (wireless) devices with access to the wired network.

The specific range that constitutes a wireless local network in accordance with the present invention depends on actual implementation details. Generally, a wireless local network can be described as having a coverage area between a few square meters and a few hundred square meters. Under certain circumstances the communication range might even go beyond. In the context of certain applications, or if the user desires, a service-consuming device must be able to assess the location of a service-providing device—that renders a particular service—within such a wireless local network. This is in particular true for input/output service-providing devices which—due to their nature—should be near to the user. Due to the physical nature of RF transmissions (imperfect antennas, reflection, absorption, and so on) it is difficult, if not impossible, to assess the location of a service-providing device. The present invention provides schemes to assess the location of a service-providing device. The present schemes cover a large percentage of conceivable situations.

The present scheme can be used in wireless local networks which are deployed in warehouses, on manufacturing floors, in offices, on trading floors, in private homes, in cars and trucks, in airplanes, and outside of buildings, just to mention some examples.

When referring to a device, any kind of device is meant that can be a member of a wireless local network. Examples of devices are: laptop computers, workpads, nodepads, personal digital assistants (PDAs), notebook computers and other wearable computers, desktop computers, computer terminals, networked computers, internet terminals and other computing systems, set-top boxes, cash registers, bar code scanners, point of sales terminals, kiosk systems, cellular phones, pagers, wrist watches, digital watches, badges, and smart cards. Other contemplated devices include: headsets, Human Interface Device (HID) compliant peripherals, data and voice access points, cameras, printers, fax machines, keyboards, joysticks, HiFi systems, audio (sound) cards, loudspeakers, amplifiers, video cards, kitchen appliances, tools, sensors such as smoke and/or fire detectors, and virtually any other digital device.

Other examples of wearable computers that can be used in connection with the present invention are, personal effects being equipped with computer-like hardware, such as a "smart wallet" computer, jewelry, or articles of clothing. In addition to a "smart wallet" computer, there are a number of other variations of the wearable computers. A "belt" computer is such a variation which allows the user to surf, dictate, and edit documents while they are moving around. Yet another example is a child's computer which is comparable to a personal digital assistant for grade-school children. The child's computer might hold assignments, perform calculations, and help kids manage their homework. It can interface with other children's computers to facilitate collaboration, and it can access a teacher's computer to download assignments or feedback. Any wearable or portable device, any office tool or equipment, home tool or equipment, system for use in vehicles, or systems for use in the public (vending machines, ticketing machines, automated teller machines, etc.) might comprise the present invention.

It is furthermore assumed that a device, as used in connection with the present invention, has a minimum amount of processing power that enables it to participate in distributed applications. Any of the above-mentioned devices can either be used as service-consuming or service providing device. Some devices can serve as service-consuming as well as service providing devices.

The devices need to be able to transmit and/or receive service information. A device must be able to become aware of its neighborhood, to discover potential communications peers in the same wireless local network, and their service offerings. In addition, it is advantageous if a device is able to indicate its presence and to advertize its own service, if any.

Any kind of service description can be used to describe the services in a format which can be processed by the devices. One preferably uses a service description which is optimized so that transmissions between devices are efficient. The service description should be flexible and extensible. In the present context the type of service is described by means of a so-called service identifier (e.g., $A_1$, $A_2$, $B_1$, as used in FIG. 6). This service identifier can be a simple flag or bit combination, for example, which describes standard types of services. These standard type of services might be predefined such that they can be identified by such a simple flag or bit combination. The service identifier can also be any other kind of information which is suited to identify one or several services offered. In addition to identifying a type of service, one might have to set or define certain parameters and options (for sake of simplicity hereinafter referred to as service parameters). This is now explained in connection with an example. A printer announces to service-consuming devices within reach that it provides printing services by sending the respective service identifier. In addition, it might want to inform the service-consuming device that it has A4 paper in one tray and A3 paper in another tray. This information is transmitted in form of service parameters. Furthermore, security features might be built in to protect certain transmissions. An error correction scheme might be used to ensure that the transmission of service information is reliable.

Network topology: The present scheme can be used in wireless local networks with point-to-point and/or point-to-multi-point connections. According to the present invention, several network segments (groups) can be established within a wireless local network. The network topology is lower-level than the subject of the present invention. Aspects of the network topology are only addressed to the extent necessary. Note that the present invention is independent of the network topology and can be used on any kind of network topology. Most implementations of the present scheme have a mesh topology. It is also possible, however, to use the present scheme in a star-shaped or ring-shaped topology, for example.

Network technology: The present scheme can be used in connection with any kind of wireless communication technique, such as RF, IR, and the like.

Well suited is the Bluetooth communications scheme, which is described in the Haartsen, Allen, Inouye, Joeressen, and Naghshineh, "Bluetooth: Vision, Goals, and Architecture" in the Mobile Computing and Communications Review, Vol. 1, No. 2. Mobile Computing and Communications Review is a publication of the ACM SIGMOBILE. This reference is incorporated by reference in its entirety.

Advertisement and/or Discovery of Services: An example of a scheme for advertisement and/or discovery of services is addressed in the above-mentioned co-pending European patent application. According to this scheme, a group of devices will take turns broadcasting (advertising) a list of services (herein referred to as service information) available. By using variable transmission delays that are reset when other advertisements are seen, and adjusting the distribution of these delays, new devices can quickly be identified, and absent machines can be noticed.

The present invention is independent of the scheme for advertisement and/or discovery of services. What is required is that a service-consuming device knows or learns about service-providing devices within the same wireless local network. For this purpose the service-consuming device stores service information (e.g. a list of entries) identifying services of which it is aware of. The service information has to be updated frequently, since a wireless local network might change from time to time.

Before addressing embodiments of the invention, the underlying scheme is addressed and additional terms are defined. We herein say two devices are in proximity of one another if and only if communication between them is possible in both directions. Furthermore, the proximity set P(a) of a device a is defined as the set of devices that are in its proximity, including itself. Two proximity sets P(x) and P(y) are herein called connected if their intersection is not empty; that is, they share at least one device:

$$P(x) \cap P(Y) \neq 0$$

Figure 3:
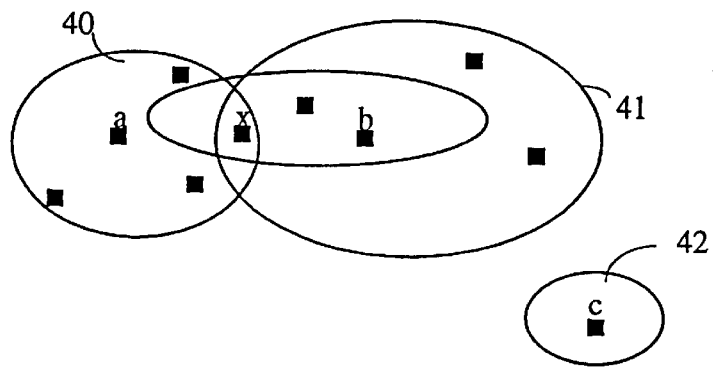
FIG. 3 is a schematic representation of a local network where the proximity sets P(a) and P(b) are connected, in accordance with the present invention.

In FIG. 3, for example, the proximity set 40 of device a and the proximity set 41 of device b are connected because their intersection contains the device x. In this example, the combination of proximity sets 40 and 41 is referred to as wireless local network. Note that the device c is not part of this wireless local network, because its proximity set 42 is neither connected to 40 nor to 41. The proximity set of a device can vary in time due to the mobility of portable or wearable devices.

Some devices (herein referred to as service-providing devices) offer one or more services. In the context of this invention we defme a service s=(i, o) to be any process that produces some result, e.g. an output o and optionally takes some input i. For example, a wristwatch might offer a time service, an MPEG headphone might offer the service of producing sound from MPEG MP3 files, and so on. In case of a data source service we use the notation ($\lambda$, o). The service S(a) of a service-providing device a includes those services $s_i$ that the service-providing device can offer itself without relying on other service-providing devices. S(a) are called the native services of service-providing device a.

Discovery protocols in wireless networks typically make use of the broadcast properties of the underlying shared medium. Accordingly, each device will broadcast from time to time service information (e.g., as suggested by the co-pending European patent application). All devices in the proximity set of the broadcasting device can receive the service information and, thus, learn about these services. The behavior of the discovery protocol arises primarily from these characteristics:

the information contained in a service offering;

the algorithm to compute the list of service offerings to be exported;

the algorithm to determine the broadcast time.

The service offering typically comprises a description of the service and the service access point. First of all a service-providing device broadcasts its own native services; additionally, devices can offer composite services. A composite service makes use of another, matching, service offered by a third device. A composite service $s^+$ is defined as the forward chaining of a native service $s_x$ with a matching remote service $s_y$, in particular:

$$s^+ = s_x \cdot s_y = (i_x, o_x) \cdot (i_y, o_y) = (i_x, o_y) \text{ iff } o_x = i_y$$

Note, that backward-chaining is also possible but might, however, result in an undesirable increased bandwidth usage; thus, for the sake of discussion in this context only the forward chaining case is considered.

Composite service advertizing has a number of advantages:

Service synthesis: Starting from service primitives, composite services allow to construct a hierarchy of services of increasing complexity.

Service mediation: Composite services can make the service of a provider available to a device that this would otherwise not see (because the service-providing device is not in its proximity set).

We call the set of composite services $S^+$ (a) of a service-providing device a its composite services. Both native and composite services of the service-providing device combined make up the complete services $S^*(a)$. Also note that the native services S(a) of service-providing device a are fixed and independent of a's proximity set P(a), whereas the composite services $S^+$ (a) of service-providing device a are variable and dependent on P(a) (and, thus, are the complete services $S^*(a)$ offered by a).

The union of all complete services offered by all service-providing devices in the proximity set P(a) of a device a constitutes the set θ(a) of available services for device a—available services in short:

$$θ(a) = \cup S^*(x)$$

$$x \in P(a)$$

Service mediation introduces its own problem, as will be illustrated using a concrete scenario. Assume a user has configured her mail application, which runs on her laptop, to directly "read" incoming messages using speech synthesis whenever possible, otherwise it should simply alert her by activating an alarm integrated into her wristwatch. The following table (Table 1) describes the devices which are present in such a scenario.

TABLE 1

Service-providing devices and their native services.

| Device a | description | native service S(x) |
|---|---|---|
| mail | laptop with mail application | (λ,ASCII) (λ,event) |
| watch | wristwatch with alarm | (event, alarm) |
| mp3man | headphone accepting MPEG audio input | (MP3, sound) |
| synth | computer generating WaveSound audio from ASCII text | (ASCII, WAV) |
| conv | computer converting WaveSound audio to MPEG audio | (WAV, MP3) |

Figure 4:
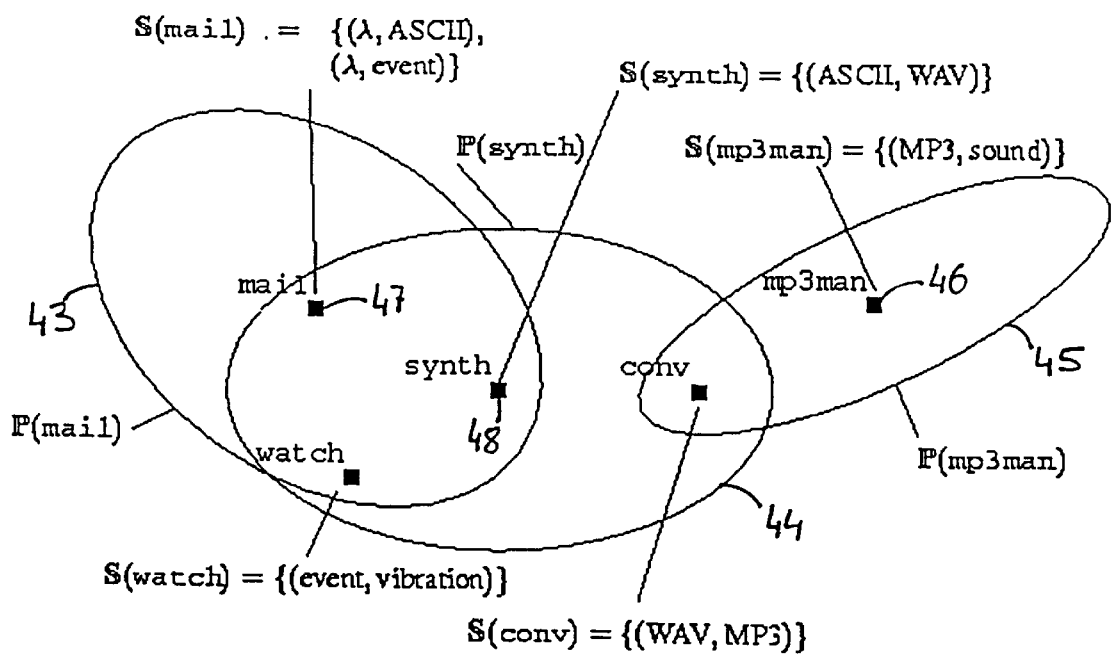
FIG. 4 is a schematic representation of a local network where the proximity sets P(mail), P(synth), and P(mp3man) are connected, in accordance with the present invention.

Let us now look at two spatial arrangements of these service-providing devices in order to illustrate the problem. FIG. 4 shows the first arrangement. Notice that all three proximity sets 43, 44, and 45 are connected (P(mail) and P(synth) as well as P(mp3man) are pair-wise connected). As Table 2 shows, the only device capable of emitting sound, the mp3man gadget 46, is not in the proximity set 43 of the mail device 47 (i.e., mp3man∉P(mail)). In other words, there are three connected proximity sets 43, 44, and 45 (P(mail), P(synth), and P(mp3man)). The mp3man device 46 offers the (MP3,sound) service (i.e., it can play MP3 files) is not in the proximity set of the user's mail device 47.

TABLE 2

Proximity sets of the scenario of FIG. 4.

| device a | proximity set P(a) |
|---|---|
| mail | {mail,synth,watch} |
| synth | {Synth,mail,conv} |
| mp3man | {mp3man,conv} |

Figure 5:
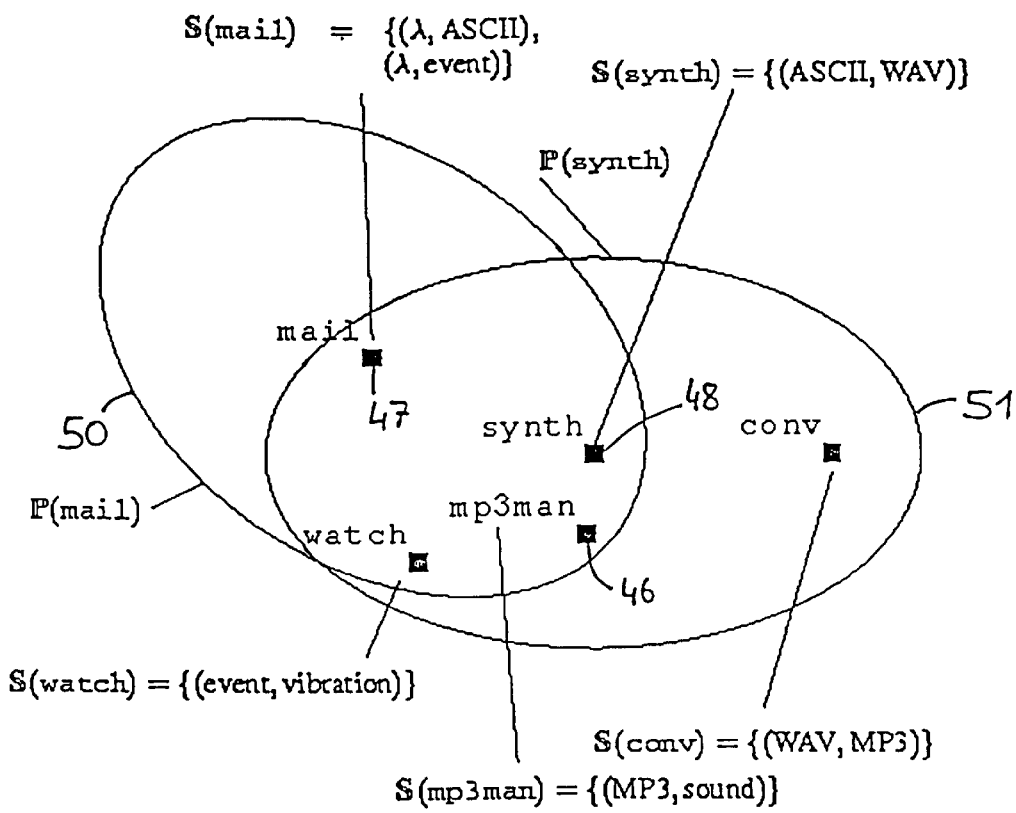
FIG. 5 is a schematic representation of a local network where there are only two connected proximity sets P(mail) and P(synth), in accordance with the present invention.

In FIG. 5 there are only two connected proximity sets 50 and 51 (P(mail) and P(synth)). Also, in contrast to the first scenario illustrated in FIG. 4, the mp3man device 46 is now in the proximity set 50 of the user's mail device 47 (i.e., mp3man∈P(mail)).

With both arrangements, the mail device 47 sees the composite service $$s_{sound} = (ASCII, sound) \in S^+(synth)$$

offered by the synth device 48—which it can use to "read" e-mail messages to the user (see also Table 3). However, the effect of using the service $s_{sound}$ in the first arrangement (FIG. 4) is quite different from using $s_{sound}$ in the second scenario (FIG. 5). In the first scenario the actual output device 46 (mp3man) is not in the proximity set of the mail device 47. Depending on the actual location of the mp3man device 46 the user might not be able to hear the read mails because the device 46 might be located outside the user's office and the connection of the proximity sets might be transient due to another user walking by the first user's office). In the second scenario, the mp3man device 46 is part of the proximity set 50 of the mail device 47—thus, the user will be able to hear the read messages.

TABLE 3

Composite and complete services of the devices of FIGS. 3 and 4.

| Device x | composite services $S^+(x)$ | complete services $S^*(x)$ |
|---|---|---|
| mail | 0 | (λ,ASCII) <br> (λ,event) |
| watch | 0 | (event, alarm) |
| synth | {(ASCII,MP3), (ASCII,sound)} | {(ASCII,WAV), (ASCII,MP3)} |
| conv | {(WAV,sound)} | {(WAV,MP3), (WAV,sound)} |
| mp3man | 0 | {(MP3,sound)} |

These two scenarios demonstrate quite nicely that in the context of certain applications, devices must be able to assess the location of the device providing the actual service. This is particularly true for input/output devices which—due to their nature—should be near the user.

Due to the physical nature of RF transmissions (imperfect antennas, reflection, absorption, and so on) a perfect solution based solely on RF coverage is not possible. The present invention proposes mechanisms to cover a large percentage of situations. Furthermore, each mechanism that is described in the next sections covers a subsequently larger percentage of situations.

Identifier checking: One implementation of the present invention includes in the service information an identifier a of the service-providing device. Thus, the service definition is extended as follows:

$$s \in S(a) \rightarrow s = (i, o, a)$$

Each service-providing device that offers a composite service $s^+$ has to use the device identifier of the remote service. That is, we redefine the forward-chaining composition as follows:

$$s_hu \mathrel{+}= s_x \cdot s_y = (i_x, o_x, x) \cdot (i_x, o_y, y)$$
$$= (i_x, o_y, y) \text{ iif } ox = iy$$

For the backward-chaining composition the device offering the composite service would have to include its application identifier. In addition, we define the origin of a service o(s) as:

$$o(s) = a$$

Enhancing Table 3 of the previous example one arrives at Table 4.

TABLE 4

Composite and complete services of the devices of FIGS. 3 and 4

| Device x | composite services $S^+(x)$ | complete services $S^*(x)$ |
|---|---|---|
| mail | 0 | {(λ,ASCII,mail) (2,event,mail)} |
| watch | 0 | {(event,alarm,watch)} |
| synth | {(ASCII,MP3,conv), (ASCII,sound,mp3man)} | {(ASCII,WAV,synth), (ASCII,MP3,conv)} |
| conv | {(WAV,sound,mp3man)} | {(WAV,MP3,conv), (WAV,sound,mp3man)} |
| mp3man | 0 | {(MP3,sound,mp3man)} |

With this mechanism each user of a service can now check whether the final service-providing device is in its proximity set. The device a now checks for each of the available services $S_i \in O(a)$ that it is interested in whether the service's origin $o(s_i)$ is in its proximity set P(a).

Note again, that due to the physical characteristics of RF based communications this solution will cover a lot of cases (the large majority in all likelihood) but not all: RF propagation is irregular and in addition devices that, for example, are located close to the walls of a room might very well have devices in their proximity set that are located in the next room (and therefore not considered adjacent to the device's user in most cases). In other words, the range of the wireless link and/or the wireless local network expands through walls, for example. Also, this approach will only allow a user to use services that are within her proximity set—in some circumstances this will not be sufficient; imagine for example a HiFi station offering sound output services for a larger room (e.g., for a living room): although the HiFi station will not constantly be in the proximity set of the user as she moves around the room she nevertheless would expect the HiFi station to be used as an output device because she is "in adjacency" to the HiFi station with respect to the room she is in.

RF location beacon: A variation of the present invention is now described. According to this variation, a stationary device (herein called beacon devices) is employed that offers a localization service $s_b$, e.g. a beacon. The RF coverage of a beacon is adjusted so that it matches the users' expectations of adjacency; for example, one could have one beacon per office or one beacon per cubicle in an open-landscape office environment. Each device in the proximity set of one of these beacon devices can then learn about its (approximate) location by using the beacon in its vicinity:

$$b = [S_b]$$

Note that we use the notation u=[s] to say that we are using service s and reference the result as u. Now, instead of including the device's identifier in the service information we include the value of the beacon b in the service information:

$$s = (i, o, b).$$

As with the identifier checking approach, each device offering a composite service has to include the beacon value of the remote service in the composite service and vice versa in the case of backward-chaining composition.

A device that wants to use a particular service si now obtains its own beacon $b_a$ and checks whether the beacon value of the service matches it. If it does, one can assume with high probability that both service-providing device and service-consuming device are in vicinity. That is, both are in adjacency from the user's point of view.

IR location beacon: Another variation of the present scheme is now described. This variant uses an infrared-based beacon instead of an RF-based one. The advantage of an infrared beacon is that infrared propagation is subject to line-of-sight which means that the beacon will not travel through walls at all.

In the following, additional aspects of the present invention are addressed.

Figure 1B:
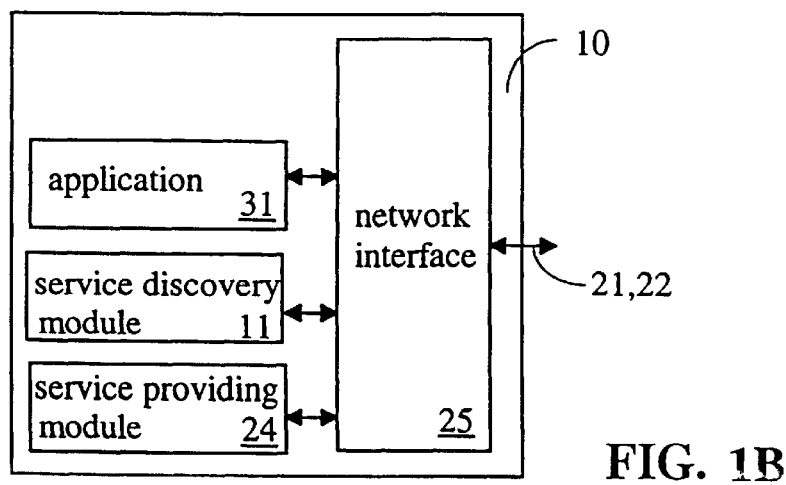
FIG. 1B is another schematic block diagram of an embodiment, in accordance with the present invention.

A service-consuming device 10, in accordance with the present invention, might comprise the building blocks illustrated in FIGS. 1A and 1B. The device 10 has a network interface unit 25, a service discovery module 11 (note that this module might be a logical module), and some sort of application 23 being executed by the device 10. The network interface unit 25 comprises a transceiver (e.g. composed of a transmitter 13 and receiver 14) which communicates with a medium access control (MAC) unit 12. The MAC layer is well defined by international standards (cf. ISO OSI (Open Standards Interconnection) reference model as described in A. S. Tannenbaum's book "Computer Networks", for example) and the MAC unit 12 might be a conventional unit employed in communication systems to control the MAC layer. Note that a MAC layer is a logical division, and would be only logically divided from other parts of the protocol implemented at 11 on the same physical device. The MAC unit 12 might be employed to detect and/or avoid collisions. In the present embodiment the MAC unit 12 is used to send and receive broadcast packets.

The transmitter 13 sends information via an output channel 21 to another device, and the receiver 14 receives through an input channel 22 information from another device. Note that in the present example there are two channels 21, 22 shown. These channels can be any kind of channels, such as an IR channel or RF channel, for example. It is conceivable that there are more than one network interface units 25. These units need not be the same. It is conceivable that these units have different types of channels, such as an IR channel or RF channel.

In addition to the network interface unit 25 the device 10 has a power supply. In the present example the power is provided by a battery 15. Likewise, the power might be provided by via a power plug, a solar cell, or the like. The power supply provides power to the components of the device 10. For sake of simplicity, the respective circuit lines or cables are not shown in FIGS. 1A and 1B.

Meta data are fed from the service discovery module 11 (SDM) via line 26 to the MAC unit 12. "Meta Data" refers to information about the protocols and/or services, as opposed to "User Data", which is useful to applications 23, for example. In the present context, meta data mainly refers to services (e.g. service information provided in form of a list of services). The service discovery module 11 is connected to a memory 16 and a central processing unit (CPU) 17. The service discovery module 11 communicates by means of application programming interfaces (APIs) 19 with other units such as applications 23, or service-providing modules 24 (SPM). Note that the service-providing module 24 is optional. A service-consuming device 10 does not need to be able to render services. It might just use other device's services.

Note that the MAC 12 and the service discovery module 11 might be logical constructs. They could be implemented on separate devices, but they can equally well be incorporated into a program stored in memory. If incorporated into a program the device 10 might physically be the same as any other conventional device, except for the fact that it comprises the above-mentioned program. This program comprises instruction that, if processed by the CPU 17, make the device 10 perform the steps according to the present invention.

The MAC unit 12 also receives normal data (herein referred to as user data) via line 20. The service discovery module 11 implements at least part of the present scheme, allowing the device 10 to distinguish services rendered by service-providing devices within its adjacency from services rendered by service-providing devices outside its adjacency. The service discovery module 11 might also implement a scheme for discovery/update of service information. The service discovery module 11 might also keep track of the known service-providing devices and also might advertize the device-resident service providers (e.g. SPM 24). The SDM 11 uses the network connection 21, 22 to obtain lists of services from other devices and also to send/advertize the list of services provided on its own device 24.

Figure 6:
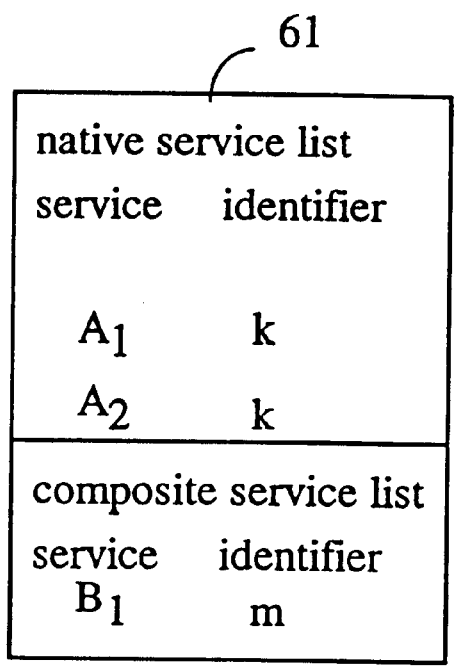
FIG. 6 is an example of service information used in connection with the present invention.

The device 10 maintains service information. This service information can be stored in device 10 in form of service entries in service lists 61 (herein referred to as record with information about services), as schematically illustrated in FIG. 6. Each service entry contains:

service information, and preferably a service description (e.g., input/output type) $A_1, A_2, B_1$, and an associated identifier (e.g. k or m). This identifier depends on the actual implementation of the present invention. The identifier might either be a device ID of the service-providing device, a set of beacon IDs or in case of a composite service at least the respective ID of the endpoint of the service-chain. If one wants to make sure that all participating devices are in adjacency of the service-consuming device, ones needs to include the device IDs or beacon IDs of all devices forming the service-chain.

The service entry might also contain information concerning a service access point (i.e., network address of an SPM providing a service), which is not shown in FIG. 6. This set of the above attributes is just an exemplary set, it might contain other attributes as well. It is herein assumed for the sake of discussion that each device is in some way uniquely identifiable by such an identifier.

The device 10 also maintains a list of identifiers about service-providing devices. According to one embodiment of the present invention, this list of identifiers of service-providing devices is equal to the proximity set of the device 10.

The actual transmission of user data might be the same as ever.

Figure 2A:
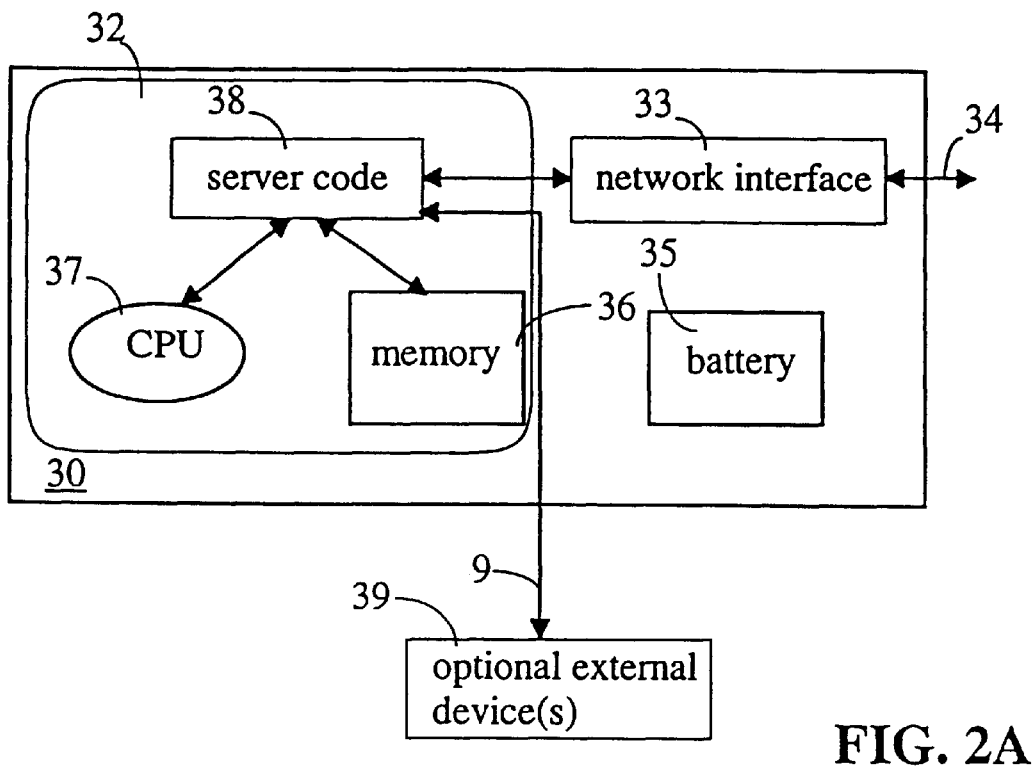
FIG. 2A is a schematic block diagram of a service-providing device, in accordance with the present invention.
Figure 2B:
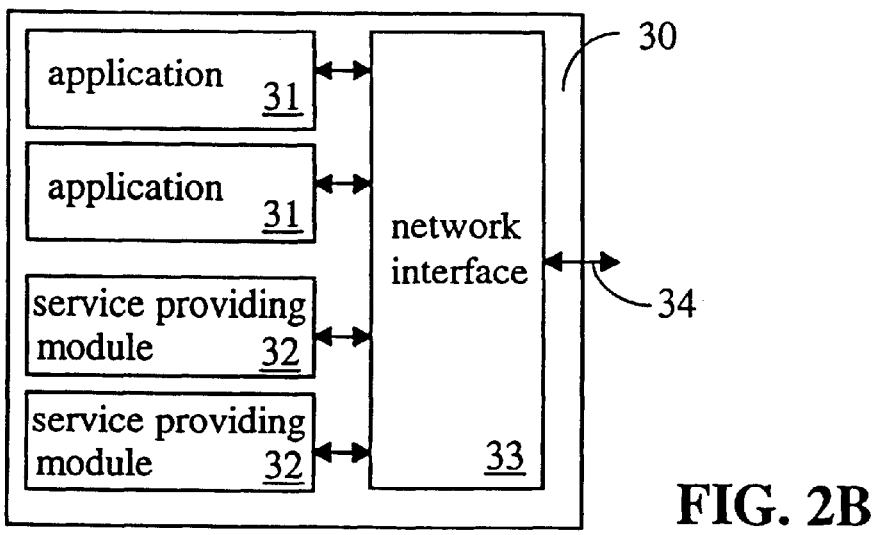
FIG. 2B is another schematic block diagram of a service-providing device, in accordance with the present invention.

A typical service-providing device 30, according to the present invention, is illustrated in FIGS. 2A and 2B. The device 30 comprises a network interface unit 33 which connects it to the wireless network 34. In the given example, the device 30 has two applications 31, which are executable by the CPU 37, and two service-providing modules 32. The service-providing modules 32 (SPMs) provide some kind of service (typically taking some input and producing some kind of output). Some services might be described as source or sink for the sake of discussion, like a HiFi speaker might be described as a sink. The SPMs 32 might offer services of their own (called "native services") and also might use other known services to provide "composite services". SPMs 32 use the network connection to actually provide services to a service-consuming device. Like in FIG. 1A, the network interface unit 33 might comprise a transmitter, receiver, and a MAC unit, for example. In the present example, the service-providing modules 32 are realized in form of software (server code) 38. This server code 38 might be retrieved from a memory 36. The software comprises instructions that, if processed by the CPU 37, make the device 30 perform the steps according to the present invention. In addition to these building blocks or logical units, the device 30 comprises a power supply 35. Furthermore, it might have an interface 9 to external devices 39.

The above described service-consuming device 10 and service-providing device 30 are different. Devices are conceivable where one and the same device might consume services and render services. A typical example is a computer (e.g. a desktop machine) which consumes printing services from a printer and which also can render ASCII to Richtext conversion, for example, for another device. Implementations are possible where devices are employed which have essentially the same building blocks.

Note that there is no clear distinction between services and applications. Some services are applications, but not all applications are services. In other words, services are a subset of applications.

Those skilled in the art will understand that the device 10 illustrated in FIGS. 1A and 1B and the device 30 illustrated in FIGS. 2A and 2B are but one example of devices implementing the present invention and that the configuration and construction of the various elements of the devices 10 and 30 uses well-known hardware and/or software. Those skilled in the art will recognize that many modifications and changes can be made to the particular embodiment described in connection with FIGS. 1A, 1B, 2A, and 2B without departing from the spirit and scope of the invention.

Figure 7:
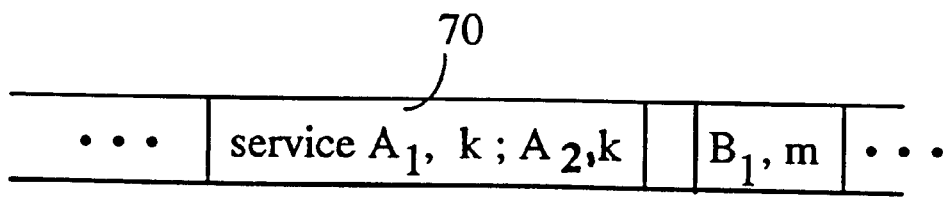
FIG. 7 is an example of a packet or frame used in connection with the present invention.

FIG. 7 is a schematic representation of a frame or packet 70, in accordance with the present invention, that is transmitted by a device of a wireless local network to announce services to all other devices that are within reach. Depending on the MAC scheme used to avoid collisions, the frame or packet 70 might comprise a MAC layer header, for example. MAC layer headers are standardized and well known in the art. The MAC layer header might comprise information to identify the source and destination of the data packets, and might also contain other information fields (for security control, medium access management, etc.). One service announcement might be spread across multiple MAC packets.

It is important that all devices that are supposed to participate in service-consuming/service-providing situations according to the present invention support at least compatible service announcement and discovery protocols for exchange of the service information.

It is understood by those skilled in the art that at the present time many of the protocols that are suited for use in wireless communications systems are still in draft status. The present scheme is independent of any particular protocol and can be used in connection with many such protocols. Somebody skilled in the art is able to implement the present scheme in existing protocol environments as well as in protocol environments under development or yet to be developed.

The present invention can be used to share services, to use services provided or rendered by other devices, and to compose or combine services.

What is claimed is:

1. A method for distinguishing services offered by a service-providing device in adjacency of a first device from services offered by a service-providing device not being in said first device's adjacency, wherein said devices are part of a wireless local network, and wherein said first device maintains a record with information about services and associated identifiers, and a list of identifiers about service-providing devices, by comparing said associated identifiers and said list of identifiers to determine an associated service as being in adjacency of said first device if it is rendered by a service-providing device being listed in said list of identifiers, to determine an associated service as not being in adjacency of said first device if it is rendered by a service-providing device not being listed in said list of identifiers.

2. The method according to claim 1, wherein said list of identifiers of service-providing devices is the proximity set of said first device.

3. The method of claim 2, wherein said associated identifier is compared with said list of identifiers to determine whether it is a member of said proximity set.

4. The method according to claim 1, wherein said associated identifier identifies the corresponding service-providing device.

5. The method of claim 1, wherein an identifier is assigned to each service-providing device in said wireless local network.

6. The method of claim 1, wherein said associated identifier is a beacon identifier assigned to a beacon device.

7. The method of claim 6, wherein the proximity set of said first device includes devices in different rooms and wherein said first device's adjacency is limited to the confines of the room in which said first device is located or a user is situated.

8. The method of claim 1, wherein stationary devices are employed within said wireless local network that offer localization services in form of beacons.

9. The method of claim 8, wherein each device in proximity of a stationary device learns about its location in said wireless local network by using said beacons in its proximity set.

10. The method of claim 8, wherein said first device determines a service as being in its adjacency by comparing beacon identifiers of said service with its list of identifiers.

11. The method of claim 1, wherein said devices communicate using an RF communications scheme.

12. The method of claim 1, wherein said local network has a coverage area between a few square meters and a few hundred square meters.

13. The method of claim 12, wherein said first device's adjacency covers an area which is smaller than said local network's coverage area.

14. An apparatus enabled for using a service offered by a service-providing device being within the same wireless local network, said apparatus comprising a network interface for wireless communication with said service-providing device, and a service discovery module which maintains a record with information services and associated identifiers, and a list of identifiers about service-providing devices, whereby said service discovery module enables said apparatus to distinguish a service offered by a service-providing device in adjacency of said apparatus from a service offered by a service-providing device not being in adjacency of said apparatus.

15. The apparatus of claim 14, wherein said service discovery module compares said associated identifiers and said list of identifiers to determine an associated service as being in adjacency of said apparatus if it is rendered by a service-providing device being listed in said list of identifiers.

16. The apparatus of claim 14, wherein said service discovery module compares said associated identifiers and said list of identifiers to determine an associated service as not being in adjacency of said apparatus if it is rendered by a service-providing device not being listed in said list of identifiers.

17. The apparatus of claim 14, wherein said network interface comprises a transceiver.

18. The apparatus of claim 14, comprising a processing unit and a memory.

19. The apparatus of claim 18, wherein said record and said list of identifiers are maintained in said memory.

20. The apparatus of claim 14 further comprising a service providing module.

21. The apparatus of claim 14, wherein said associated identifier is a device identifier, and wherein a device identifier is assigned to each service-providing device of said local network.

22. The apparatus of claim 14, wherein said list of identifiers comprises device identifiers of all service-providing devices which are within said adjacency of said apparatus.

23. The apparatus of claim 14, wherein said service is a process that produces some result.

24. The apparatus of claim 14, wherein said wireless local network comprises at least two service-providing devices, whereby one of said service-providing devices offers a composite service making use of a service offered by the other service-providing device.

25. The apparatus of claim 14, wherein said service is a composite service which is constructed from service primitives.

26. The apparatus of claim 25, wherein said composite service is provided by a chain of at least two service-providing devices, and wherein at least the last device of said chain is within adjacency of said apparatus.

27. The apparatus of claim 14, wherein said service discovery module selects from a set of available service those which are within the adjacency of said apparatus.

28. The apparatus of claim 14, wherein said wireless local network comprises a stationary device that offer localization services in form of beacons.

29. The apparatus of claim 28, wherein each device in proximity of a stationary device can learn about its location in said wireless local network by using said beacons in its proximity set.

30. The apparatus of claim 14 being a portable computer or a hand-held computer.

31. A method for distinguishing services offered by a service-providing device in adjacency of a first device from services offered by a service-providing device not being in said first device's adjacency, wherein said devices are part of a wireless local network and said service-providing device offers a composite service making use of a service offered by another device, and wherein said first device maintains a record with information about services and associated identifiers, and a list of identifiers about service-providing devices, by comparing said associated identifiers and said list of identifiers to determine an associated service as being in adjacency of said first device if it is rendered by a service-providing device being listed in said list of identifiers, to determine an associated service as not being in adjacency of said first device if it is rendered by a service-providing device not being listed in said list of identifiers.

32. The method of claim 31, wherein said composite service is obtained by forward chaining of a service offered by said service-providing device itself with a matching service offered by said another device.

33. The method of claim 31, wherein said composite service is constructed from service primitives.

34. The method of claim 31, wherein said composite service is a service that requires at least two separate service-providing devices to interact or cooperate.

35. The method of claim 34, wherein said first device compares said associated identifier and said list of identifiers to determine whether said two separate service-providing devices are within said first device's adjacency.

36. The method of claim 34, wherein said first device makes use of said composite service only if said two separate service-providing devices both are within said first device's adjacency.

37. The method of claim 31, wherein said composite service is provided by a chain of at least two service-providing devices, and wherein at least the last device of said chain is within adjacency of said first device.

38. A computer program product for sharing services amongst devices in adjacency on a wireless local network, said computer program product comprising a computer usable medium having computer readable program code thereon, said computer readable program code comprising:

computer program code means for maintaining a record with information about services and associated identifiers and maintaining a list of identifiers about service-providing devices, an associated service rendered by a service-providing device listed in said list of identifiers being in adjacency, an associated service rendered by a service-providing device not listed in said list of identifiers being not in adjacency; and computer program code means for distinguishing services offered by a service-providing device in adjacency from services offered by a service-providing device not being in adjacency.

39. A computer program product as in claim 38, wherein said associated identifier identifies the corresponding service-providing device.

40. A computer program product as in claim 38, wherein said means for distinguishing compares said associated identifier with said list of identifiers to determine whether it is a member of a proximity set.

41. A computer program product as in claim 38, wherein said associated identifier is a beacon identifier assigned to a beacon device.

42. A computer program product as in claim 38, further comprising:

computer program code means for determining a service as being in adjacency by comparing a device beacon identifier with said list of identifiers.

43. A computer program product as in claim 38, further comprising:

computer program code means for offering a composite service including a service offered by at least two service-providing devices.

44. A computer program product as in claim 43, wherein said composite service is obtained by forward chaining of a service offered by a first said service-providing device itself with a matching service offered by a second said service-providing device.

45. A computer program product as in claim 43, further comprising:

computer program code means for constructing said composite service from service primitives.

46. A computer program product as in claim 43, wherein said composite service is a service that requires at least two separate service-providing devices to interact or cooperate.

47. A computer program product as in claim 46, further comprising:

computer program code means for comparing said associated identifier and said list of identifiers to determine whether said two separate service-providing devices are in adjacency.

48. A computer program product as in claim 46, wherein said composite service is used only if said two separate service-providing devices both are in adjacency.

49. A computer program product as in claim 43, wherein said composite service is provided by a chain of at least two service-providing devices, and wherein at least the last device of said chain is in adjacency.

* * * * *

UNITED STATES PATENT AND TRADEMARK OFFICE
CERTIFICATE OF CORRECTION

PATENT NO. : 6,633,757 B1
DATED : October 14, 2003
INVENTOR(S) : Hermann et al.

It is certified that error appears in the above-identified patent and that said Letters Patent is hereby corrected as shown below:

Column 11,
Line 37, please delete "$shu\ +=s_x \cdot s_y=(i_x,o_x,x) \cdot (i_x,o_y,y)$" and insert -- $-s^+=s_x \cdot s_y=(i_x,o_x,x) \cdot (i_y,o_y,y)$ --.

Signed and Sealed this

Sixteenth Day of March, 2004

JON W. DUDAS
*Acting Director of the United States Patent and Trademark Office*